United States Patent
Johnson et al.

(10) Patent No.: US 10,075,213 B2
(45) Date of Patent: *Sep. 11, 2018

(54) BEACON-BASED CONTACTLESS READER IDENTIFICATION

(71) Applicant: GOOGLE LLC, Mountain View, CA (US)

(72) Inventors: Kai P. Johnson, San Diego, CA (US); Ryan L. Watkins, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,130

(22) Filed: Oct. 23, 2017

(65) Prior Publication Data

US 2018/0048356 A1 Feb. 15, 2018

Related U.S. Application Data

(63) Continuation of application No. 14/592,085, filed on Jan. 8, 2015.
(Continued)

(51) Int. Cl.
*H04B 7/00* (2006.01)
*H04B 5/00* (2006.01)
(Continued)

(52) U.S. Cl.
CPC ......... *H04B 5/0031* (2013.01); *H04B 5/0056* (2013.01); *H04W 4/008* (2013.01);
(Continued)

(58) Field of Classification Search
CPC ........... H04B 17/0057; H04B 17/0042; H04W 24/00; H04L 1/0026
(Continued)

(56) References Cited

U.S. PATENT DOCUMENTS 5,551,061 A * 8/1996 Schwendeman ..... G08B 3/1083
342/457
8,447,331 B2 5/2013 Busch
(Continued)

FOREIGN PATENT DOCUMENTS

WO 2012/092293 A2 7/2012
WO 2015/105932 A1 7/2015

OTHER PUBLICATIONS

Chinese Patent Office, "Chinese Office Action issued in Chinese Application No. 201580008173.0", dated Dec. 22, 2017, 3 pages of English Translation and 3 pages of Chinese Office Action.
(Continued)

Primary Examiner — Raj Chakraborty
(74) Attorney, Agent, or Firm — Johnson, Marcou & Isaacs, LLC

(57) ABSTRACT

Systems, methods, and computer program products are provided for using proximity sensing systems, such as Bluetooth low energy (LE) beacons, to uniquely identify remote computing systems, such as point of sale terminals. A mobile device includes an antenna, a baseband modem, and a contactless frontend, and is able to perform near-field communication transactions. The mobile device antenna receives radio communications from one or more Bluetooth LE beacons, the transmissions including data packets with a unique identifier. The mobile device calculates the signal strength of the one or more Bluetooth LE beacons at a time proximate to when a near-field communication transaction is initiated. The mobile device stores in its memory the data packet associated with the Bluetooth LE beacon broadcasting the strongest signal.

17 Claims, 5 Drawing Sheets

Related U.S. Application Data

(60) Provisional application No. 61/925,062, filed on Jan. 8, 2014.

(51) Int. Cl.

| | | |
|---|---|---|
| *H04W 4/20* | (2018.01) | |
| *H04W 4/06* | (2009.01) | |
| *H04W 4/00* | (2018.01) | |
| *H04W 4/21* | (2018.01) | |
| *H04W 4/80* | (2018.01) | |
| *H04W 84/18* | (2009.01) | |

(52) U.S. Cl.
CPC ............ *H04W 4/06* (2013.01); *H04W 4/206* (2013.01); *H04W 4/21* (2018.02); *H04W 4/80* (2018.02); *H04W 84/18* (2013.01)

(58) Field of Classification Search
USPC ........................................................ 455/41.1
See application file for complete search history.

(56) References Cited

U.S. PATENT DOCUMENTS

| | | | | |
|---|---|---|---|---|
| 8,787,855 | B2* | 7/2014 | Rousu | H04W 8/245 455/150.1 |
| 2002/0102988 | A1 | 8/2002 | Myllymaki | |
| 2005/0136845 | A1 | 6/2005 | Masuoka et al. | |
| 2007/0281716 | A1 | 12/2007 | Altman et al. | |
| 2008/0248815 | A1 | 10/2008 | Busch | |
| 2008/0268931 | A1 | 10/2008 | Alderucci et al. | |
| 2011/0178863 | A1 | 7/2011 | Daigle | |
| 2012/0130796 | A1 | 5/2012 | Busch | |
| 2013/0030931 | A1 | 1/2013 | Moshfeghi | |
| 2013/0166399 | A1* | 6/2013 | Awad | G06Q 30/0207 705/16 |
| 2013/0173736 | A1 | 7/2013 | Krzeminski et al. | |
| 2013/0281084 | A1 | 10/2013 | Batada et al. | |
| 2014/0108084 | A1* | 4/2014 | Bargetzi | G06Q 10/1095 705/7.19 |
| 2014/0358685 | A1* | 12/2014 | Want | G06Q 30/0261 705/14.58 |
| 2015/0195008 | A1 | 7/2015 | Johnson et al. | |

OTHER PUBLICATIONS

Chakraborthy, "U.S. Office Action issued in copending U.S. Appl. No. 14/592,085, filed Jan. 8, 2015", dated Jun. 15, 2016, 13 pages.

Chakraborty, "U.S. Office Action issued in copending U.S. Appl. No. 14/592,085, filed Jan. 8, 2015", dated Nov. 14, 2016, 26 pages.

Chakraborty, "U.S. Office Action issued in copending U.S. Appl. No. 14/592,085, filed Jan. 8, 2015", dated Apr. 11, 2017, 27 pages.

Dao, "U.S. Office Action issued in copending U.S. Appl. No. 14/592,085, filed Jan. 8, 2015", dated Jan. 29, 2016, 9 pages.

Davis, et al., "From Context to Content: Leveraging Context to Infer Media Metadata", Proc. of 12th Annual ACM International Conference on Multimedia (MM2004), ACM Press, Oct. 2004, 8 pages.

Davis, et al., "MMM2: Mobile Media Metadata for Media Sharing", Extended Abstracts of the Conf. on Human Factors in Computing System, 2005, 5 pages.

Davis, "Using Context and Similarity for Face and Location Identification", Proceedings of SPIE 6061, Jan. 16, 2006, 9 pages.

Ferrandis-Ruiz, "Extended European Search Report issued in European Application No. 15735172.7", dated Jul. 27, 2017, 13 Pages.

Kang, "International Search Report and Written Opinion issued in International Application No. PCT/US2015/010557", dated Apr. 13, 2015, 13 pages.

Liu, et al., "Extracting Semantic Location from Outdoor Positioning Systems", Proceedings of the 7th International Conference on Mobile Data Management (MDM'06), 2006, 8 pages.

Mohri, "International Preliminary Report on Patentability issued in International Application No. PCT/US2015/010557", dated Jul. 21, 2016, 10 pages.

Patterson, et al., "Nomatic: Location by, for, and of Crowds", LNCS 3987, LoCA 2006, pp. 186-203.

Sarvas, et al., "Metadata Creation System for Mobile Images", In: Proceedings of the Second International Conference on Mobile Systems, Applications, and Services (MobiSys2004), Jun. 6-9, 2004, pp. 36-48.

Smith, et al., "Social Disclosure of Place: From Location Technology to Communication Practices", PERVASIVE'05—Proc. ,—Social Disclosure of Place—From Location Technology to Communication Practices—, PERVASIVE'05—Proc. 3d Int'l Conf. on Pervasive Computing, 2005, 18 pages.

Smith, "Social-Mobile Applications", Invisible Computer, Intel Research Seattle, Apr. 2005, 2 pages.

Wilhelm, et al., "Photo Annotation on a Camera Phone", In Extended Abstracts of the 2004 Conference on Human Factors in Computing Systems (CHI 2004). ACM Press, Apr. 24-29, 2004, 5 pages.

Yoshino, et al., "NAMBA: Location-Aware Collaboration System for Shopping and Meeting", IEEE Transactions on Consumer Electronics, vol. 48, No. 3, Aug. 2002, pp. 470-477.

Ferrandis-Ruiz, "European Office Action issued in European Application No. 15735172.7", dated Jun. 1, 2018, 7 pages.

\* cited by examiner

BEACON-BASED CONTACTLESS READER IDENTIFICATION

CROSS REFERENCE TO RELATED APPLICATIONS

This application is a continuation of and claims priority to U.S. patent application Ser. No. 14/592,085 filed Jan. 8, 2015, and entitled "Systems, Methods, And Computer Program Products For Identifying Remote Computing Systems," which claims the benefit of U.S. Provisional Application No. 61/925,062, filed Jan. 8, 2014. The complete disclosure of each above-identified priority applications is hereby fully incorporated herein by reference.

BACKGROUND

Field

The present invention generally relates to identifying remote computing systems in a mobile environment. More particularly, the present invention relates to systems, methods, and computer program products for using proximity sensing systems, such as Bluetooth low energy (LE) beacons to uniquely identify remote computing systems, such as point of sale terminals.

Related Art

Mobile devices receive transmissions from Bluetooth low energy devices (referred to herein as "Bluetooth LE beacons"). Bluetooth LE beacon communications are unidirectional, i.e., only "broadcasting" or "advertising" but never receiving information back from any mobile device that receives the transmissions. Typical Bluetooth LE beacons use periodic and continual broadcasts (or "advertising") of data packets to communicate with nearby devices. These data packets are typically only approximately 31 bytes in size, with only 28 of those bytes usable for data. Once a mobile device receives the data packet, it can extract the data and either directly use the data, or send the data in a query to server to get back additional data.

The Bluetooth LE beacons may be associated with other devices (i.e., remote computing systems), and consumers, merchants, and/or other entities may desire identifying the associated devices during a transaction. For example, in a mobile commerce environment, any of the entities may want to identify a point of sale (e.g., a specific checkout lane within a multi-lane store) for the purposes of tracking performance, monitoring usage, or identifying trouble spots. A consumer may use an application that uses the identity of a point of sale to find discounts that may be applied to a purchase. A bank or card payment scheme may use the identity of a point of sale to isolate trouble spots, where transactions are frequently declined or where fraud occurs. Bluetooth LE beacons may broadcast data packets with any of the aforementioned information, or may include a unique identifier associated with a particular device. The unique identifier may then be sent to a server to retrieve the information associated with that device.

One technical challenge exists because mobile devices may receive transmissions (e.g., broadcasts) from more than one Bluetooth LE beacon at a time, and thus cannot identify which particular remote computing system is associated with which Bluetooth LE beacon. Bluetooth LE beacon signal strengths may vary depending on the transmission power, distance to the mobile device, and environmental factors such as device orientation, obstructions within the signal path, and/or radio interference, such that a mobile device cannot use signal strength alone to identify the device associated with the Bluetooth LE beacon.

It would be preferable to have a system, method, and computer program product for using proximity sensing devices to resolve the ambiguity between multiple transmissions to uniquely identify the associated remote computing system.

BRIEF DESCRIPTION

The present invention provides systems, methods, and computer program products for using proximity sensing systems to uniquely identify remote computing systems.

In one embodiment, a system for obtaining data associated with a remote computing system includes a memory, an antenna, and a processor communicatively coupled to the memory. The processor receives a transmission from at least one proximity sensing system, the transmission including at least one data packet. The data packet includes a unique identifier corresponding to the at least one proximity sensing system. The processor initiates a contactless transaction when the antenna is placed within a predetermined proximity to a contactless reader. The processor calculates a signal strength from each of the at least one proximity sensing system, and stores in the memory the data packet associated with the proximity sensing system producing the highest signal strength.

In another embodiment, a method for obtaining data associated with a remote computing system includes: receiving a transmission from at least one proximity sensing system, wherein the transmission includes a data packet including a unique identifier corresponding to the at least one proximity sensing system; initiating a contactless transaction when an antenna is placed within a predetermined proximity to a contactless reader; calculating a signal strength from each of the at least one proximity sensing system; and storing in the memory the data packet associated with the proximity sensing system producing the highest signal strength.

In another embodiment, a non-transitory computer-readable medium has stored thereon sequences of instructions for causing one or more processors to: receive a transmission from at least one proximity sensing system, the transmission including at least one data packet including a unique identifier corresponding to the at least one proximity sensing system; initiate a contactless transaction when an antenna is placed within a predetermined proximity to a contactless reader; calculate a signal strength from each of the at least one proximity sensing system; and store in the memory the data packet associated with the proximity sensing system producing the highest signal strength.

BRIEF DESCRIPTION OF THE DRAWINGS

The features and advantages of the present invention will become more apparent from the detailed description set forth below when taken in conjunction with the following drawings.

DETAILED DESCRIPTION

The example embodiments of the invention presented herein are directed to systems, methods, and computer program products for using proximity sensing systems to uniquely identify remote computing systems. Some of the embodiments are described below in terms of an example system in a mobile commerce environment using a Bluetooth LE beacon to uniquely identify a point of sale terminal. This is for convenience only and not intended to limit the application of the present invention. After reading the following description, it will be apparent to one skilled in the relevant art(s) how to implement the following invention in alternative embodiments, such as identifying information about systems and devices other than point of sale terminals.

Generally, systems, methods, and computer program products are provided for using proximity sensing systems to uniquely identify remote computing systems. A mobile device interacts with a proximity sensing device and a contactless reader, each of which is associated with a remote computing system, and calculates the signal strength of the proximity sensing device to identify the associated computing system.

Particularly, the mobile device may have an application that may run either actively or in the background on the mobile device. The application receives transmissions from one or more proximity sensing systems, each of the proximity sensing systems being associated with a remote computing system. The mobile device initiates a contactless transaction with a near-field communication (NFC) contactless reader, which is also associated with the remote computing device. Upon initiating the contactless transaction, the mobile device calculates the signal strength of each of the proximity sensing systems to determine which proximity sensing system is associated with the remote computing system. The mobile device will store in its memory a data packet associated with the proximity sensing system broadcasting the highest signal strength.

The features discussed above are described in further detail below, with reference to FIGS. 1-6.

System

Figure 1:
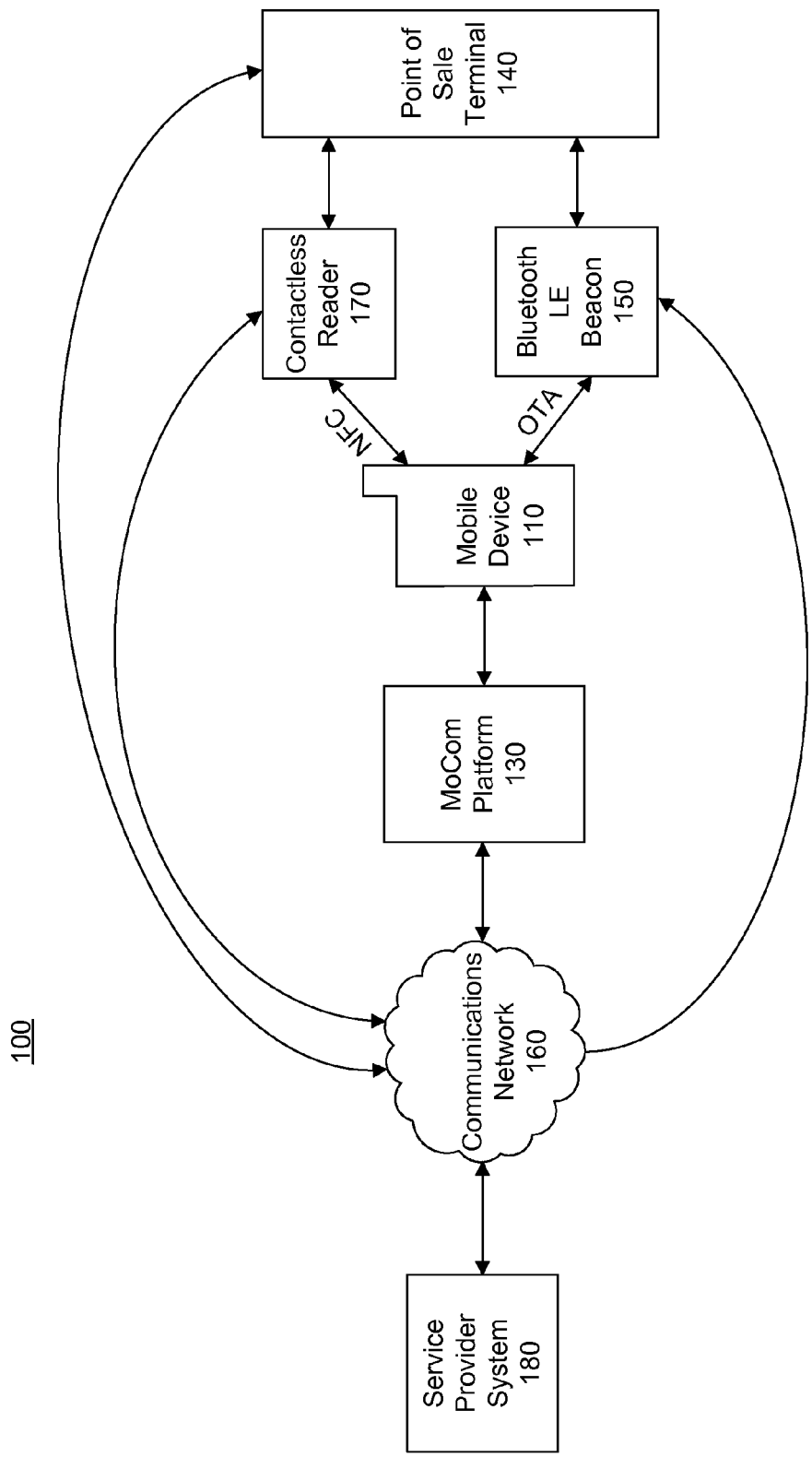
FIG. 1 is an illustration of a system for using a proximity sensing system to uniquely identify a remote computing system according to an example embodiment.

FIG. 1 is an illustration of a system 100 for using proximity sensing devices to uniquely identify remote computing systems. As shown in FIG. 1, system 100 includes a mobile device 110; a contactless reader 120; a remote computing system, described in this embodiment as a point of sale ("POS") terminal 140; a proximity sensing system, described in this embodiment as a Bluetooth LE beacon 150; a mobile commerce (MoCom) platform 130; a communications network 160; and a service provider system 180. The POS terminal 140, the contactless reader 120, and the Bluetooth LE beacon 150 may all be in the same housing, each in a separate housing, or a combination of those components may be either in the same housing and in separate housings (e.g., the POS terminal 140 and the contactless reader 120 may be in the same housing, but the Bluetooth LE beacon 150 may be located outside of the housing).

The mobile device 110 may be, for example, a cellular phone, a tablet, or the like, and includes a processor, a memory, an antenna, a contactless frontend (CLF), a baseband modem, and a user interface such as a display. The antenna receives and transmits radio frequencies (RF) associated with different types of wireless network technologies, such as mobile network connections (e.g., 4G LTE cellular service), Wi-Fi network communications, Bluetooth, Bluetooth LE, GPS, and the like. Baseband modem is a digital modem that is used for managing each of the radio communications. CLF is circuitry which handles the analog aspect of contactless communications or near-field communication (NFC) and the communication protocol layers of a contactless transmission link. CLF is also used to exchange data between reader 120 and a secure element and/or a memory contained in the mobile device 110, for example, to execute contactless transactions.

The Secure element may be implemented as a Universal Integrated Circuit Card, embedded SE card, secure micro secure digital card, and the like. The secure element is generally considered secure because it is a self-contained system, including dedicated memory, and is protected by hardware and software hardening techniques that are verified by independent testing. The secure element need not be arranged as hardware within the mobile device 110. The secure element may be implemented as a "virtual" secure element. The virtual secure element may be maintained outside the mobile device on any memory accessible to the mobile device, including but not limited to, for example, a remote server or computer, in the cloud, and the like.

The mobile device 110 communicates with the reader 120 using ISO 7816 commands over the NFC ISO 14443 protocol, as described more fully in U.S. application Ser. No. 13/901,134, entitled "Systems, Methods, and Computer Program Products for Providing a Contactless Protocol," the contents of which are incorporated herein by reference in their entirety. NFC devices have a range less than approximately 0.2 m, and operate at a frequency of approximately 13.56 MHz.

Mobile device 110 is further communicatively coupled to a mobile commerce platform ("MoCom platform") 130. The MoCom platform 130 is further communicatively coupled to one or more service provider systems 180. A service provider system may be a merchant system, which is a system managed by a merchant (e.g., business, retailer, and the like), for example, for managing mobile commerce transactions; for creating, processing, and managing (e.g., editing, withdrawing, etc.) merchant offers; for obtaining and disseminating information associated with a point of sale terminal; and the like.

The MoCom platform 130 may include a processor and one or more servers (i.e., memory) for storing and managing data related to mobile commerce transactions (e.g., offer data, loyalty data, rewards data) and/or service provider data (i.e., information related to service provider systems 180); rules and/or means for processing redeemed offers, distributing offers to mobile wallets, and the like; and for obtaining and disseminating information associated with particular point of sale terminals. The MoCom platform 130 may further include an interface, which may be an application programming interface (API) and the like. A service provider system 180 may access the interface of the MoCom platform 130 via a communications network 160 in order to store information on the memory of the MoCom platform 130. For example, a service provider can create offers and rewards, disseminate information, and the like. In one embodiment, the service provider system 180 may store a set of data on the memory of the MoCom platform 130 corresponding to a unique identifier, such that when a mobile device 110 sends a unique identifier to the MoCom platform 130, the mobile device 110 can retrieve the set of data corresponding to that identifier.

Mobile device 110 is further communicatively coupled to one or more Bluetooth LE beacons 150. Each Bluetooth LE beacon 150 has a memory, a processor, and an antenna. A data packet, which may include a unique identifier, is stored on the Bluetooth LE beacon 150 memory. The Bluetooth LE beacon antenna transmits radio frequencies that may be received by another device, such as a mobile phone, tablet, or the like. Each of the Bluetooth LE beacons 150 has a broadcast range less than approximately 100 m, and broadcasts continuously at a frequency between approximately 2.4 GHz and approximately 2.5 GHz. "Broadcasting continuously," as used herein with respect to each of the Bluetooth LE beacons 150, means broadcasting (or "advertising") data packets at a predetermined, continuous interval. For example, a Bluetooth LE beacon 150 may broadcast a data packet once every half-second, once every second, once every ten seconds, etc. Bluetooth LE beacons operate according to network standards IEEE 802.15.X (e.g., IEEE 802.15.1, 802.15.4, etc.).

The mobile device 110 may include at least one mobile application. The mobile application receives a transmission from each of the Bluetooth LE beacons 150, either when the application is active (e.g., being used by a user) or when the application is operating in the background (e.g., not actively being used by a user). The mobile application is capable of calculating the signal strength of the transmission from each of the Bluetooth LE beacons 150, storing data packets associated with each Bluetooth LE transmission in the mobile device memory, and communicating with the MoCom platform 130.

The mobile device 110 may calculate the signal strength of each of the transmissions from the Bluetooth LE beacons 150, for example, by using a received signal strength indicator (RSSI). RSSI is a measurement of the power present in a received radio signal, such as a Bluetooth LE transmission. A strong signal will have a higher power, and accordingly, a higher RSSI value. The RSSI value may be compared to the RSSI values from other signals to determine the relative strengths of the signals.

The Bluetooth LE beacon 150 may be configured to communicate with other devices. In one embodiment, as shown in FIG. 1, the service provider systems 180 may be configured to communicate with Bluetooth LE beacon 150, the contactless reader 120, and/or the POS terminal 140 through a communications network 160. The service provider systems may send information in the form of data packets to the Bluetooth LE beacons 150 over the communications network 160. The Bluetooth LE beacon 150 stores the data packet on its memory, and broadcasts the data packet according to predetermined instructions. But it is not required that the Bluetooth LE beacon 150 communicate with a remote system. For example, in another embodiment, the Bluetooth LE beacon 150 has the data packet pre-stored on its memory without any communication from a remote computing system (e.g., service provider system 180).

The mobile device 110 may use the proximity of the Bluetooth LE beacon 150 to the contactless reader 120 to uniquely identify a POS terminal 140 associated with the Bluetooth LE beacon 150. This unique identification is discussed in further detail below with reference to FIGS. 2-6.

While only one service provider system 180, one mobile device 110, one Bluetooth LE beacon 150, one contactless reader 120, and one point of sale terminal 140 are shown in FIG. 1, it should be understood that one or more of the aforementioned devices may be implemented in the system 100.

Process

At least one Bluetooth LE beacon (e.g., FIG. 1, Bluetooth LE beacon 150) continuously broadcasts (or "advertises") a data packet at a frequency between 2.4 GHz and 2.5 GHz. The data packets typically contain thirty-one (31) bytes of data. Three (3) bytes are used for information related to the Bluetooth LE protocol, and twenty-eight (28) bytes are available to be used to send data to other devices.

In one embodiment, the Bluetooth LE beacon broadcasts a data packet which includes information pertaining to a merchant, an individual store, and an individual point of sale within the store associated with the Bluetooth LE beacon. In another embodiment, the Bluetooth LE beacon broadcasts a data packet which includes a unique identifier. In another embodiment, the Bluetooth LE beacon broadcasts a data packet which includes a unique identifier, and the unique identifier is dynamically changed (i.e., periodically rotating the unique identifier associated with the Bluetooth LE beacon). The unique identifier may be sent to a remote server (e.g., FIG. 1, MoCom platform 130) to retrieve sets of data corresponding to the unique identifier broadcasted by the Bluetooth LE beacon. The sets of data may include information pertaining to a particular merchant, an individual store, and an individual point of sale, as well as coupons, offers, discounts, and the like.

The process for retrieving information pertaining to an individual point of sale using a Bluetooth LE beacon is described in more detail below with reference to FIGS. 2-4. The process will be described with respect to a Bluetooth LE beacon broadcasting a data packet including a unique identifier, but should be understood that the data packet could include any type of data, as described above.

Figure 2:
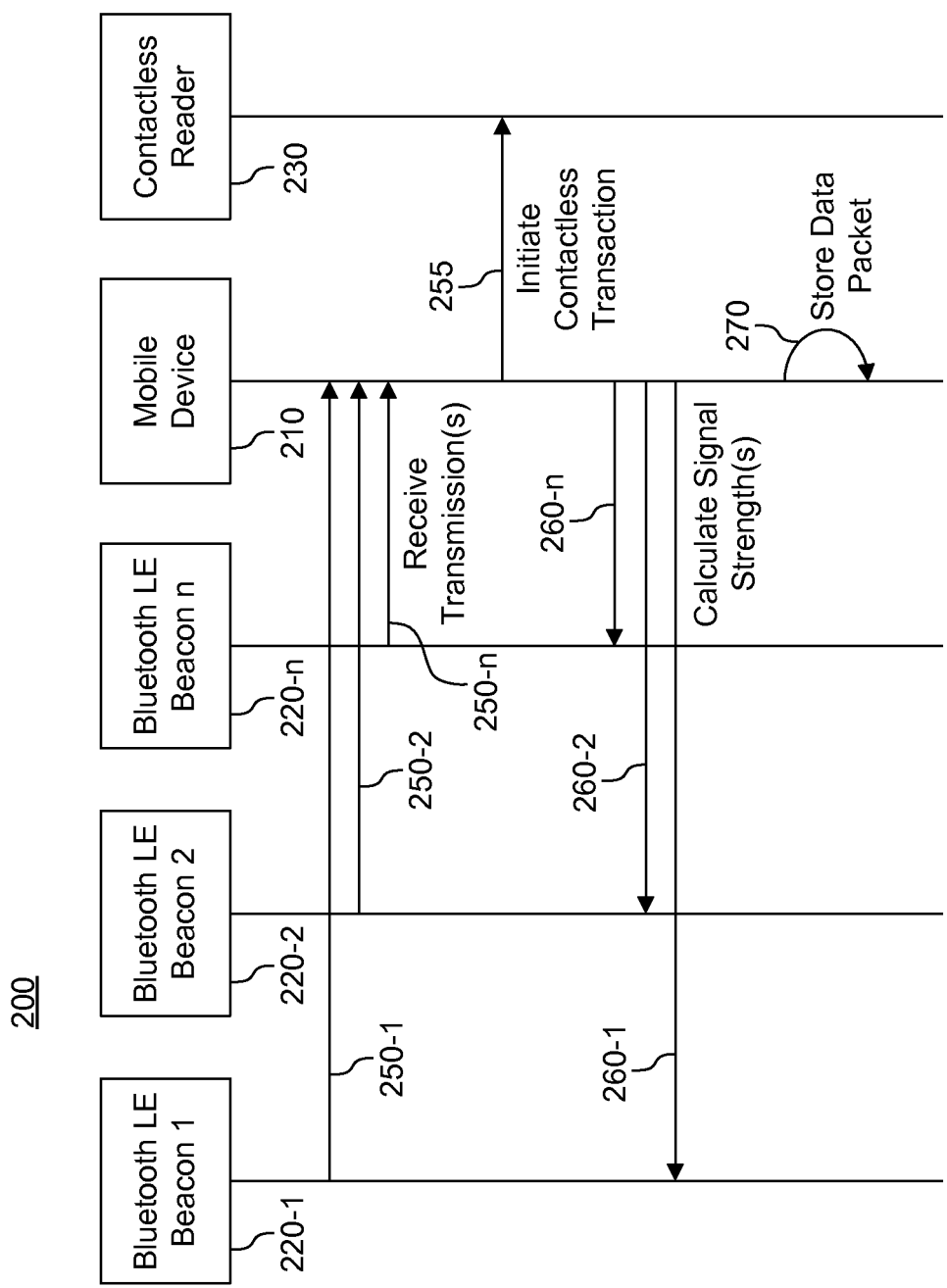
FIG. 2 is a sequence diagram illustrating a process for using a proximity sensing system to uniquely identify a remote computing system according to an example embodiment.

FIG. 2 is a diagram illustrating a process 200 for using proximity sensing systems to uniquely identify a remote computing system (e.g., a POS terminal), according to an example embodiment. In general, when the mobile device 210 detects a contactless transaction is occurring, such as a NFC contactless transaction, the mobile device 210 scans all the Bluetooth LE beacons 220 in range and sorts them by the observed signal strength. The mobile device 210 stores the data packet associated with the Bluetooth LE beacon 220 broadcasting the highest signal strength in the memory of the mobile device 210.

In particular, at steps 250-1, 250-2, and 250-n (collectively, 250), a mobile device 210 receives transmissions (or "broadcasts" or "advertisements") from one or more Bluetooth LE beacons 220-1, 220-2, and 220-n (collectively, 220), respectively. Each Bluetooth LE beacon 220 broadcasts a data packet with a unique identifier.

At step 255, the mobile device 210 initiates a contactless transaction, for example a NFC contactless transaction, with a contactless reader 230. The contactless reader 230 is associated with a POS terminal (e.g., FIG. 1, POS terminal 140).

The mobile device 210 is able to determine the signal strength of the Bluetooth LE beacons' 220 broadcasts. At steps 260-1, 260-2, and 260-n (collectively, 260), the mobile device 210 calculates the broadcasting signal strength of each of the Bluetooth LE beacons 220 at a time proximate to when the NFC contactless transaction occurs. Bluetooth LE beacon signal strengths may vary depending on the transmission power, distance to the mobile device, and environmental factors such as device orientation, obstructions within the signal path, and/or radio interference. One advantage of calculating the signal strength of the Bluetooth LE beacons 220 at a time proximate to the contactless transaction between the mobile device 210 and contactless reader 230 is that the environmental factors at such a short range (i.e., less than 0.2 m) are significantly reduced. Accordingly, the signal strength of the Bluetooth LE beacon 220 associated with the point of sale terminal will be significantly greater than the signal strength of any other Bluetooth LE beacon broadcast received by the mobile device 210.

At step 270, the mobile device 210 stores the data packet transmitted by the Bluetooth LE beacon 220 with the highest signal strength in the memory of the mobile device 210.

Figure 3:
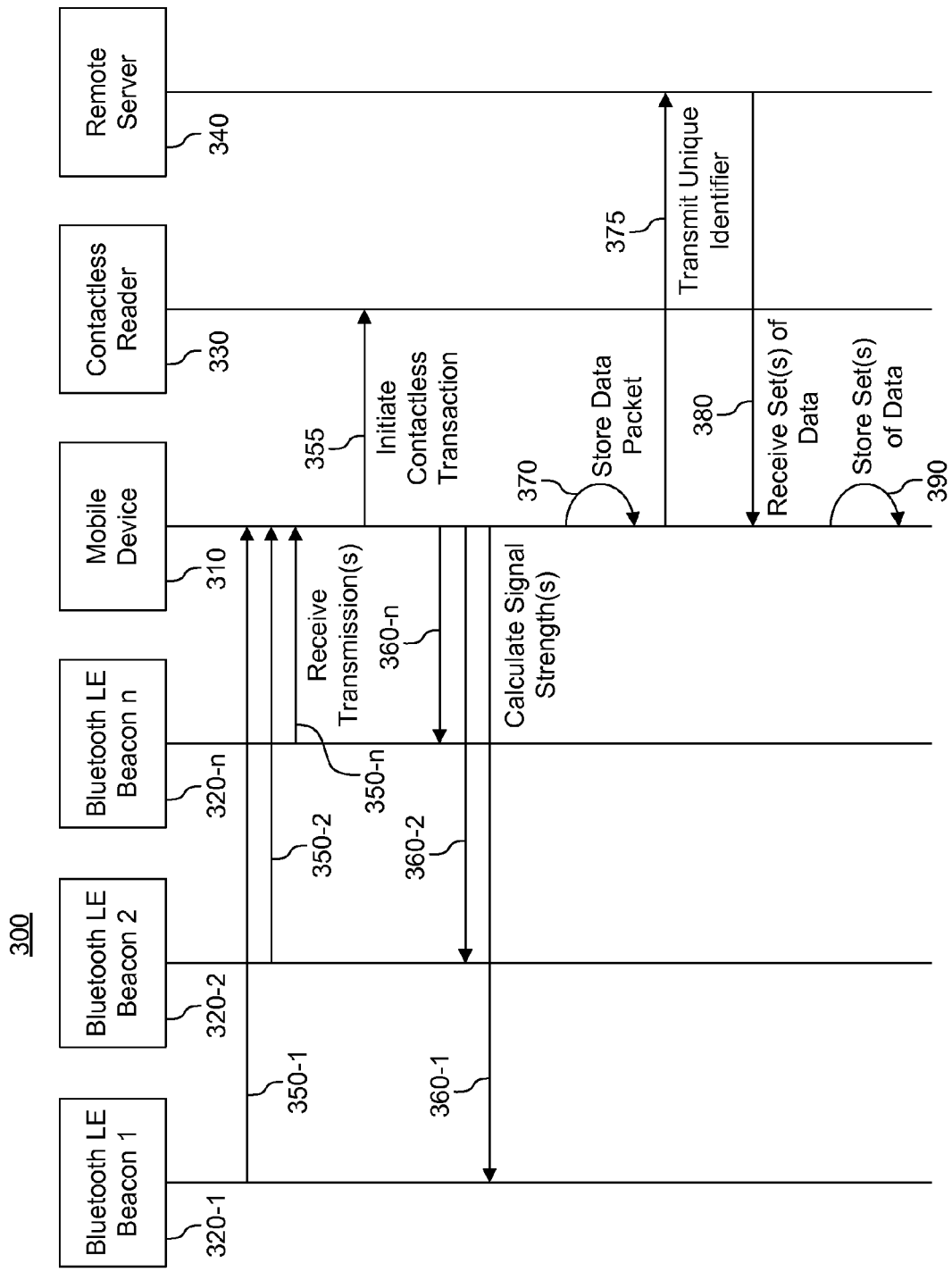
FIG. 3 is a sequence diagram illustrating a process for using a proximity sensing system to uniquely identify a remote computing system according to an example embodiment.

FIG. 3 is a sequence diagram of a process 300 for using proximity sensing systems to uniquely identify a remote computing system (e.g., a POS terminal), according to an embodiment of the present invention.

Similar to process 200, the mobile device of process 300 receives transmissions at steps 350-1, 350-2, and 350-n (collectively, 350) from Bluetooth LE beacons 320-1, 320-2, and 320-n (collectively, 320), respectively. The mobile device 310 initiates a contactless transaction at step 355, calculates the signal strengths of the Bluetooth LE beacons' 320 broadcasts at steps 360-1, 360-2, and 360-n (collectively, 360), and stores the data packet transmitted by the Bluetooth LE beacon 320 with the highest signal strength in the memory of the mobile device 310. The data packet includes a unique identifier associated with the Bluetooth LE beacon 320.

At step 375, the mobile device 310 transmits the unique identifier to a remote server 440 (e.g., FIG. 1, MoCom platform 130). The remote server 440 may include a memory, a processor, and/or an interface, and includes one or more sets of data corresponding to the unique identifier. The one or more sets of data may include, for example, information pertaining to a particular merchant, an individual store, and an individual point of sale, as well as coupons, offers, discounts, and the like.

The transmission of the unique identifier to the remote server 440 may occur at a time proximate to when the data packet received from the Bluetooth LE beacon 320 is stored on the memory of the mobile device 310. In another embodiment, the mobile device 310 transmits the unique identifier to the remote server 340 after a predetermined amount of time after being stored on the memory of the mobile device 310. For example, the transmission of the unique identifier may occur at a specific time each day, for example, 12:00 pm. In yet another embodiment, the transmission of the unique identifier from the mobile device 310 to the remote server 340 may occur upon the occurrence of a specific event. For example, if the mobile device 310 does not have a cellular signal or a wireless internet connection at the time of the contactless transaction, the mobile device 310 may store the data packet in its memory and transmit the unique identifier to the remote server 340 when the mobile device 310 first establishes communication with the remote server 340, either through cellular service or wired/wireless internet connection.

The mobile device 310, at step 380, receives the one or more sets of data corresponding to the unique identifier included in the data packet of the Bluetooth LE beacon 320 with highest signal strength from the remote server 340. The mobile device 310, at step 390, then stores the one or more sets of data on the memory of the mobile device 310.

Figure 4:
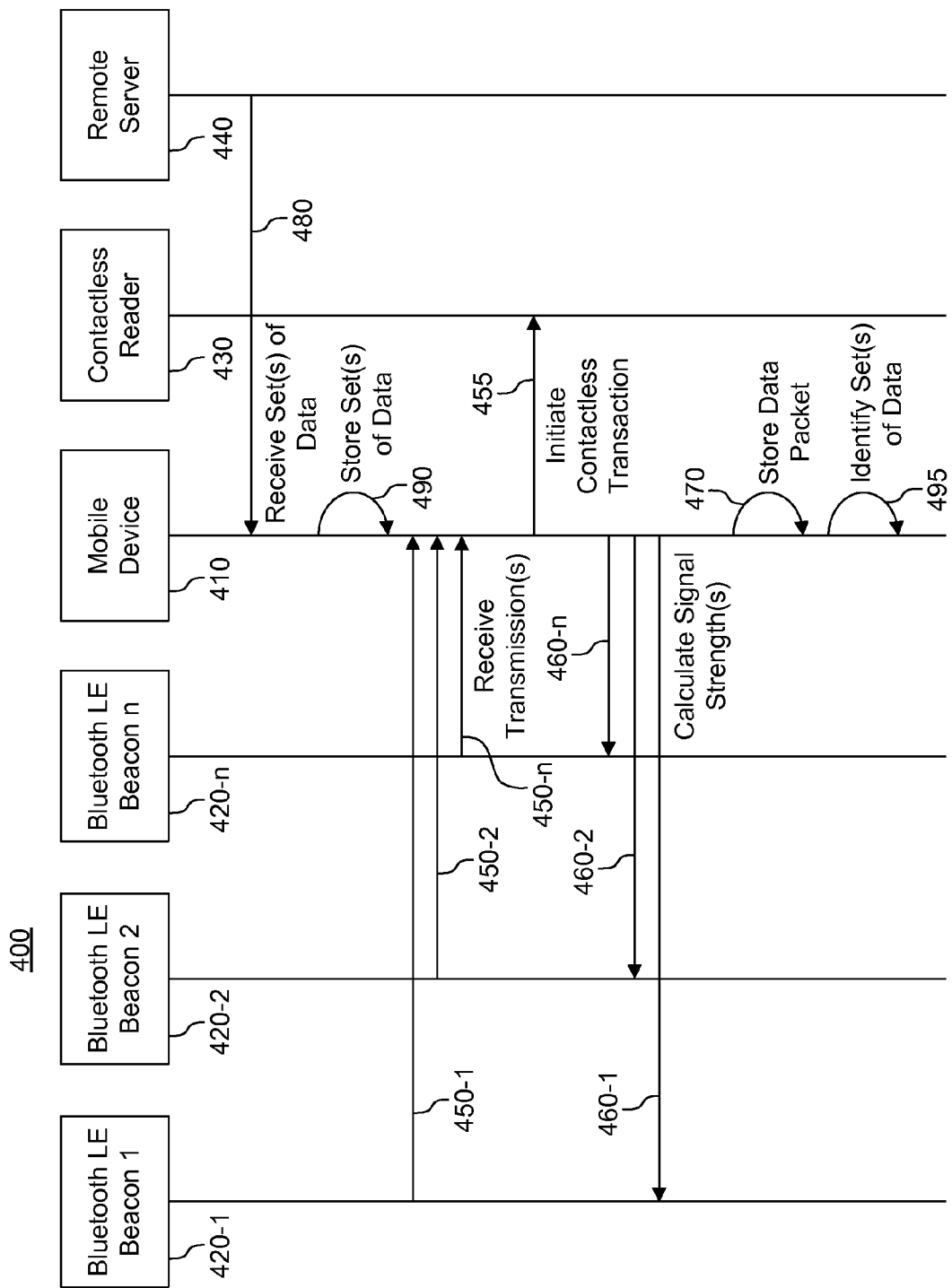
FIG. 4 is a sequence diagram illustrating a process for using a proximity sensing system to uniquely identify a remote computing system according to an example embodiment.

FIG. 4 is a sequence diagram of a process 400 for using proximity sensing systems to uniquely identify a remote computing system (e.g., a point of sale terminal), according to an embodiment of the present invention.

The process 400 is similar to process 200 and process 300, except the mobile device receives one or more sets of data corresponding to one or more unique identifiers.

At step 480, the mobile device 410 receives one or more unique identifiers from the remote server 440 and receives one or more sets of data corresponding to the one or more unique identifiers from the remote server 440. In one embodiment, the mobile device 410 may receive a matrix of unique identifiers and sets of data. For example, the mobile device 410 may receive unique identifiers A, B, and C from the remote server 440, as well as sets of data A-1, A-2, A-n, B-1, B-2, B-n, C-1, C-2, C-n, that correspond to the unique identifiers A, B, and C, respectively.

The mobile device 410 stores each of the unique identifiers and each of the corresponding sets of data received from the remote server 440 on the memory of the mobile device 410.

Similar to process 200 and 300, the mobile device 410 receives transmissions 450-1, 450-2, and 450-n (collectively, 450) from Bluetooth LE beacons 420-1, 420-2, and 420-n (collectively, 420), respectively. The mobile device 410 initiates a contactless transaction, at step 445, with a contactless reader 430, and calculates the signal strength of each of the Bluetooth LE beacons 420. The mobile device 410 stores the data packet received in the transmissions 450 corresponding to the Bluetooth LE beacon 420 with the highest signal strength at a time proximate to when the mobile device 410 initiates the contactless transaction 455 with the contactless reader 430.

The mobile device 410, at step 495, retrieves the one or more sets of data stored on its memory corresponding to the unique identifier included in the data packet received from the Bluetooth LE beacon 420 with the highest signal strength.

Example Computer-Readable Medium Implementation

The example embodiments described above such as, for example, the systems and procedures depicted in or discussed in connection with FIGS. 1-4 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 5:
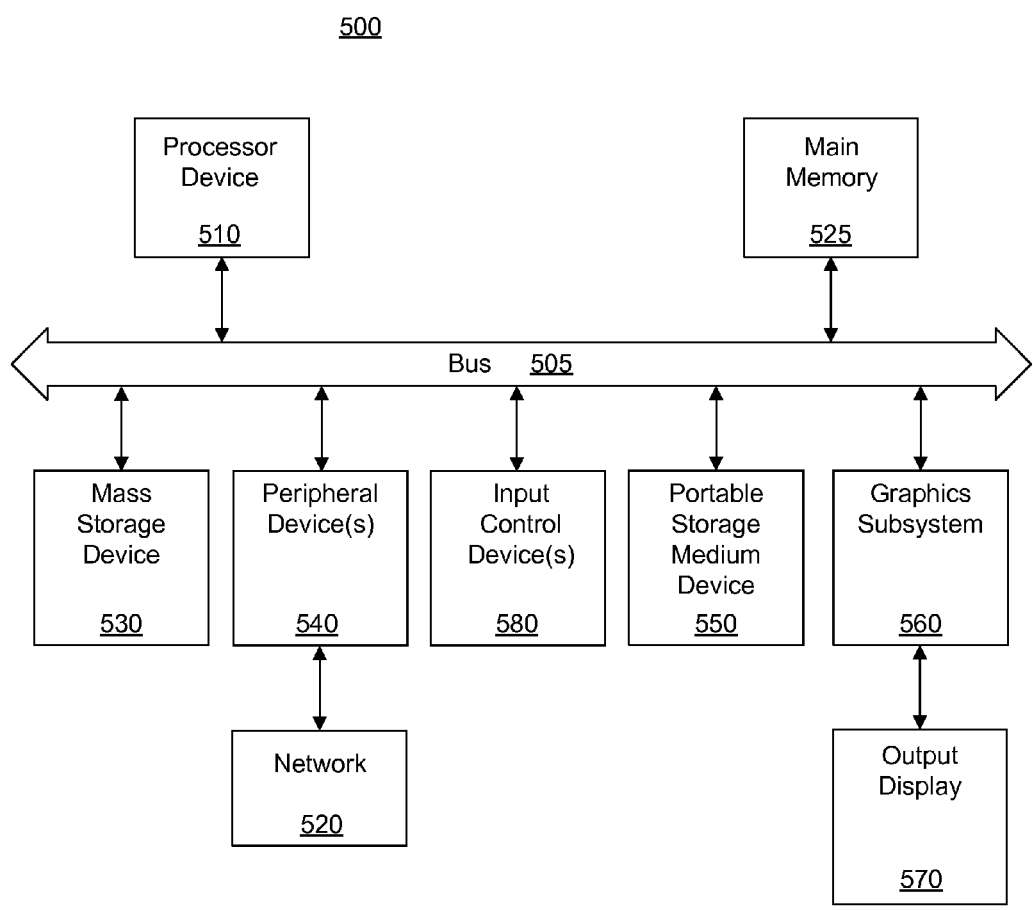
FIG. 5 is a block diagram of a device for use with various example embodiments of the invention.

FIG. 5 is a block diagram of a general and/or special purpose computer 500, which may be a general and/or special purpose computing device, in accordance with some of the example embodiments of the invention. The computer 500 may be, for example, a user device, a user computer, a client computer and/or a server computer, among other things.

The computer 500 may include without limitation a processor device 510, a main memory 525, and an interconnect bus 505. The processor device 510 may include without limitation a single microprocessor, or may include a plurality of microprocessors for configuring the computer 500 as a multi-processor system. The main memory 525 stores, among other things, instructions and/or data for execution by the processor device 510. The main memory 525 may include banks of dynamic random access memory (DRAM), as well as cache memory.

The computer 500 may further include a mass storage device 530, peripheral device(s) 540, portable non-transitory storage medium device(s) 550, input control device(s) 580, a graphics subsystem 560, and/or an output display interface 570. For explanatory purposes, all components in the computer 500 are shown in FIG. 5 as being coupled via the bus 505. However, the computer 500 is not so limited. Devices of the computer 500 may be coupled via one or more data transport means. For example, the processor device 510 and/or the main memory 525 may be coupled via a local microprocessor bus. The mass storage device, 530, peripheral device(s) 540, portable storage medium device(s) 550, and/or graphics subsystem 560 may be coupled via one or more input/output (I/O) buses. The mass storage device 730 may be a nonvolatile storage device for storing data and/or instructions for use by the processor device 510. The mass storage device 730 may be implemented, for example, with a magnetic disk drive or an optical disk drive. In a software embodiment, the mass storage device 530 is configured for loading contents of the mass storage device 530 into the main memory 525.

The portable storage medium device 550 operates in conjunction with a nonvolatile portable storage medium, such as, for example, a compact disc read only memory (CD-ROM), to input and output data and code to and from the computer 500. In some embodiments, the software for storing information may be stored on a portable storage medium, and may be inputted into the computer 500 via the portable storage medium device 550. The peripheral device(s) 540 may include any type of computer support device, such as, for example, an input/output (I/O) interface configured to add additional functionality to the computer 500. For example, the peripheral device(s) 540 may include a network interface card for interfacing the computer 500 with a network 520.

The input control device(s) 580 provide a portion of the user interface for a user of the computer 500. The input control device(s) 580 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 700 may include the graphics subsystem 560 and the output display 570. The output display 570 may include a cathode ray tube (CRT) display and/or a liquid crystal display (LCD). The graphics subsystem 560 receives textual and graphical information, and processes the information for output to the output display 570.

Each component of the computer 500 may represent a broad category of a computer component of a general and/or special purpose computer. Components of the computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It is apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures. Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to obtain contactless reader data, comprising:
   a memory,
   an antenna, and
   a processor, communicatively coupled to the memory and the antenna, wherein the processor is operable to execute application code instructions that are stored in the memory to cause the system to:
      initiate a contactless transaction in response to the antenna being placed within a predetermined proximity to a contactless reader;
      upon initiating the contactless transaction, receive, via the antenna, a radio frequency (RF) broadcast from at least one of a plurality of beacons, each RF broadcast including at least one data packet comprising a unique identifier corresponding to the at least one of the plurality of beacons;
      calculate a signal strength of each received RF broadcast;
      store in the memory, as corresponding to the contactless reader, the at least one data packet comprising a unique identifier corresponding to the beacon calculated as producing the highest signal strength;
      transmit each stored unique identifier to a server; and
      receive, from the server, in response to transmitting each stored unique identifier to the server, one or more sets of data, each set of data corresponding to the unique identifier.

2. The system of claim 1, wherein the transmission of the unique identifier to the server begins approximately at a time when the data packet is stored in the memory.

3. The system of claim 1, wherein the transmission of the unique identifier to the server begins at a predetermined time after the data packet is stored in the memory.

4. The system of claim 1, wherein the transmission of the unique identifier to the server begins after the data packet is stored in the memory and upon the occurrence of a predetermined event.

5. The system of claim 4, wherein the predetermined event comprises a time of day.

6. The system of claim 4, wherein the predetermined event comprises establishing communication with the server.

7. A method to obtain contactless reader data, comprising:
   initiating, by one or more computing devices, a contactless transaction in response to an antenna of the one or more computing devices being placed within a predetermined proximity to a contactless reader;
   upon initiating the contactless transaction, receiving, by the one or more computing devices, a radio frequency (RF) broadcast from at least one of a plurality of beacons, each RF broadcast including at least one data packet comprising a unique identifier corresponding to the at least one beacon;
   calculating, by the one or more computing devices, a signal strength of each received RF broadcast;
   storing, by the one or more computing devices in a memory as corresponding to the contactless reader, the at least one data packet comprising a unique identifier corresponding to the beacon calculated as producing the highest signal strength;
   transmitting, by the one or more computing devices, each stored unique identifier to a server; and
   receiving, by the one or more computing devices from the server, in response to transmitting each stored unique identifier to the server, one or more sets of data, each set of data corresponding to the unique identifier.

8. The method according to claim 7, wherein the transmission of the unique identifier to the server begins approximately at a time when the data packet is stored in the memory.

9. The method according to claim 7, wherein the transmission of the unique identifier to the server begins at a predetermined time after the data packet is stored in the memory.

10. The method according to claim 7, wherein the transmission of the unique identifier to the server begins after the data packet is stored in the memory and upon the occurrence of a predetermined event.

11. The method of claim 10, wherein the predetermined event comprises a time of day.

12. The method of claim 10, wherein the predetermined event comprises establishing communication with the server.

13. A computer program product, comprising:
   a non-transitory computer-readable storage device having computer-executable program instructions embodied thereon that when executed by a computer cause the computer to obtain contactless reader data, the computer-executable instructions comprising:
      computer-executable instructions to initiate a contactless transaction in response to an antenna of the computer being placed within a predetermined proximity to a contactless reader;
      computer-executable instructions to receive, upon initiating the contactless transaction, a radio frequency (RF) broadcast from at least one of a plurality of beacons, each RF broadcast comprising a unique identifier corresponding to the at least one of the plurality of beacons;
      computer-executable instructions to calculate a signal strength of each received RF broadcast;
      computer-executable instructions to store in a memory, as corresponding to the contactless reader, the at least one data packet comprising the unique identified corresponding to the beacon calculated as producing the highest signal strength;
      computer-executable instructions to transmit each stored unique identifier to a server; and
      computer-executable instructions to receive, from the server, in response to transmitting each stored unique identifier to the server, one or more sets of data, each set of data corresponding to the unique identifier.

14. The computer program product of claim 13, wherein the transmission of the unique identifier to the server begins approximately at a time when the data packet is stored in the memory.

15. The computer program product of claim 13, wherein the transmission of the unique identifier to the server begins at a predetermined time after the data packet is stored in the memory.

16. The computer program product of claim 13, wherein the transmission of the unique identifier to the server begins after the data packet is stored in the memory and upon the occurrence of a predetermined event.

17. The computer program product of claim 16, wherein the predetermined event comprises a time of day.

\* \* \* \* \*